Jan. 5, 1937.  H. C. SNYDER  2,066,702
AUTOMATIC SHEET MEASURING AND SORTING DEVICE
Filed Feb. 10, 1932  3 Sheets-Sheet 1

INVENTOR.
Howard C Snyder
ATTORNEY.

Jan. 5, 1937.   H. C. SNYDER   2,066,702
AUTOMATIC SHEET MEASURING AND SORTING DEVICE
Filed Feb. 10, 1932   3 Sheets-Sheet 2

INVENTOR.
Howard C. Snyder
BY
ATTORNEYS

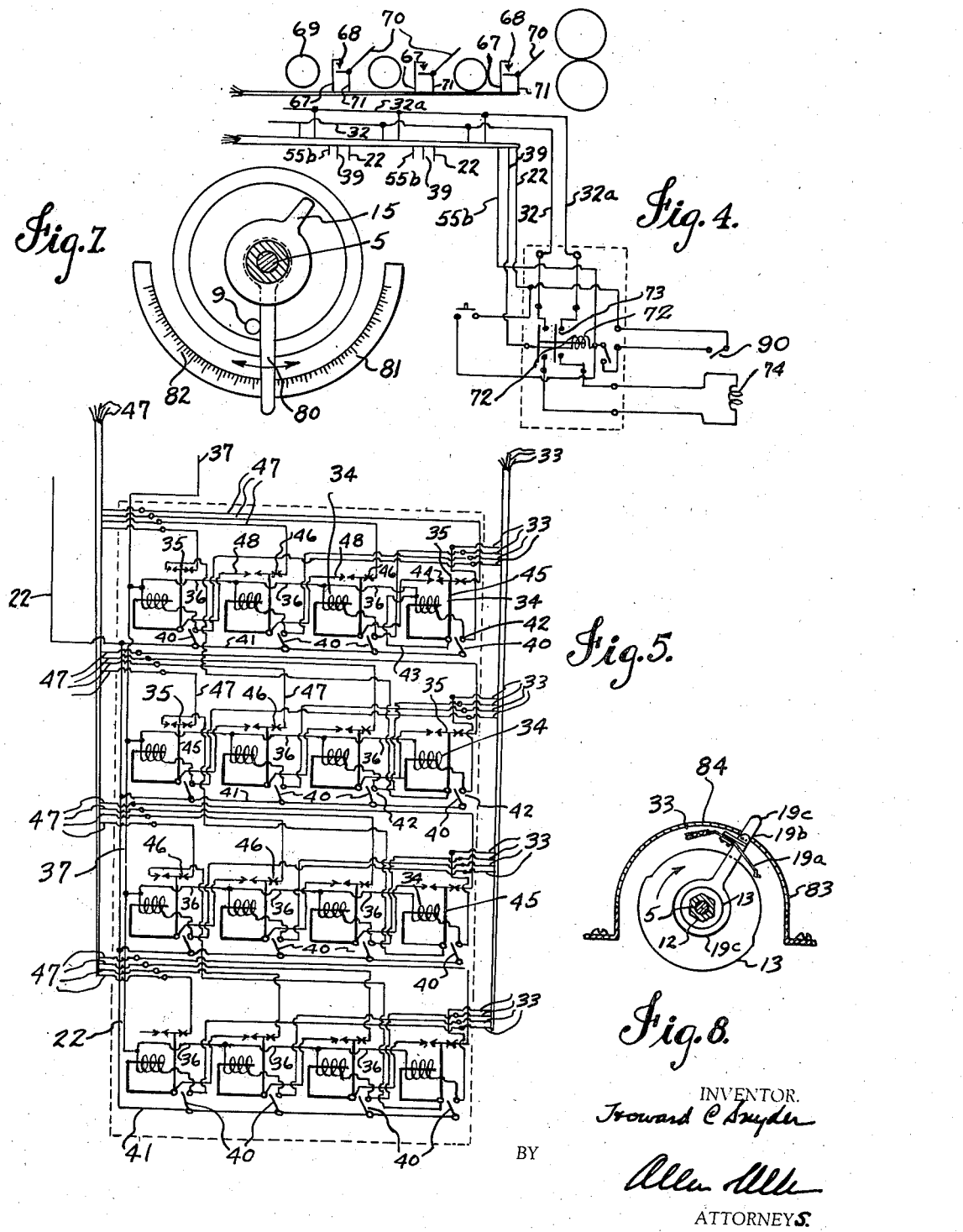

Patented Jan. 5, 1937

2,066,702

UNITED STATES PATENT OFFICE 2,066,702

AUTOMATIC SHEET MEASURING AND SORTING DEVICE

Howard C. Snyder, Ashland, Ky., assignor to The American Rolling Mill Company, Middletown, Ohio, a corporation of Ohio Application February 10, 1932, Serial No. 592,203

14 Claims. (Cl. 209—82)

My invention relates to electrically operated measuring devices used in connection with conveyors having take-off mechanisms that are put into operation by the measuring device while the sheet or other article is traveling along the conveyor.

"Measuring", as used herein, applies to a determination of the qualities of articles in accordance with which they are to be sorted into piles. The measurement may be one of length, weight, gauge or other quality. For the purpose of making an exemplary disclosure, I shall describe my invention in an embodiment which has for its object the measurement and sorting of metallic sheets in accordance with their respective lengths.

In the process of rolling sheet metal, it frequently happens that the end edges of the final sheet are irregular. This necessitates the squaring of the sheet by shearing off the irregular edges. It is not usually possible to obtain successive sheets of the same length without considerable waste, and for practical purposes it has been found more economical to allow the cut lengths of sheet to vary with the effective length of the rolled pieces, and thereby decrease the amount of end waste to a minimum. With the variation in length it becomes necessary to sort the sheets rapidly so as not to make the sorting the slowest point in the line of operation.

It is an object of my invention to provide a mechanism that will be adjustable to fractional divisions between a maximum and minimum length of sheets in coordination with an electrical control system operated by the length of the sheet to remove the sheet from the conveying means at a predetermined stacking station.

Another object of my invention is the provision of means for measuring a sheet or other object, means to provide a setting determinative of the classification to which the article belongs, and means essentially traveling with the sheet or article to energize classifying means when the desired point has been reached by the sheet.

Still another object of my invention is the provision, in combination with conveying means and distributing means, of adjustable means for predetermining a plurality of classifications, means for determining to which classification the article belongs, and means actuated by the foregoing means for setting in motion distributing means at the proper time.

Consequently, it is a more specific object of my invention to provide for use in connection with other features, controlling means having a part which passes through various cycles corresponding to portions of travel of the sheet or article to be classified, which means controls actuating means for a distributing mechanism at a time when the sheet or article is within the zone of effect of said distributing mechanism.

These and other objects of my invention which will be pointed out hereinafter, or will be apparent to one skilled in the art upon reading these specifications, I accomplish by that certain construction and arrangement of parts of which I shall now describe an exemplary embodiment, reference being made to the drawings which form a part hereof.

These and other objects will be more specifically pointed out in the specifications and the drawings illustrating a preferred embodiment of my invention.

In the drawings:

Fig. 4 is a diagrammatic representation of the wiring to a clutch controller together with the continuation of the conveyor from Fig. 3.

Fig. 5 is a diagrammatic representation of the distributing panel with its relay switches.

Fig. 7 is a sectional view along the lines 7—7 of Fig. 1.

Fig. 8 is a sectional view along the lines 8—8 of Fig. 1.

Figure 1:
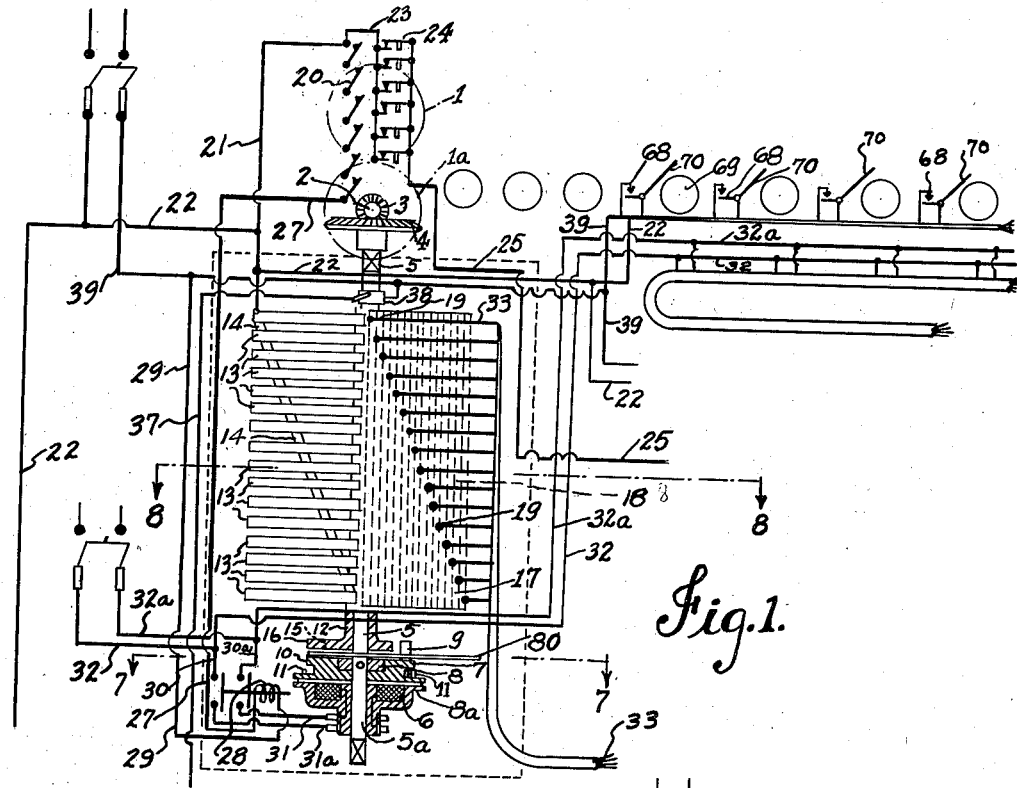
Figure 1 is a diagrammatic representation of the pinch rolls, part of the conveyor and also the measuring device.

Briefly, in the practice of my invention, I provide a conveyor for the sheets and an electrically controlled measuring device which is set into operation by the passage of the sheet over an initial part of the conveying means. The measuring means comprises a set of switches operated by the sheet and a controlling device arranged to obtain a setting by controlled movement proportional to the length of the sheet. This controlling means has provision whereby it may be set to certain maximum and minimum lengths and proportional divisions of the intervening lengths. The function of the controlling means is to set a circuit appropriate to the specific length classification of any individual sheet. This circuit, when set, is the selective actuating circuit for a step by step device in which a body representative of the sheet goes through a predetermined number of stations representative of the position of the sheet on the conveying means. The number of stations thus passed through is predetermined by the controlling means aforesaid, and the function of the moving body is to actuate a selected distributing means for the sheet at the time when the sheet reaches it. By "distributing means" I refer to a device or devices whereby the sheet is taken off the conveyor and deposited in a certain pile.

Diagrammatically illustrated are a pair of pinch rolls 1 and 1a which will be supported and driven in the usual manner. On the extension of the shaft 2 of the lower pinch roll is fixed a gear 3. This gear is in mesh with another gear 4 fixed on another shaft 5.

On the end 5a of this shaft there is an electro-magnetic clutch which comprises an electro-magnet 6 permanently fastened to the end of the shaft 5a so as to rotate with it. Rotatably mounted on the shaft above the magnet 6 is an armature 7, which is held in a longitudinal spaced relation on the shaft by means of a collar 8 permanently fastened to the shaft 5 by means of a pin or any other suitable means. Fixed to the armature and extending away from the magnet is a pin 9 which acts as a stop and also is used to drive a bushing which will be described later. A cycloidal wound spring 11 is placed in a groove 10 with one end fastened on the supporting frame and the other end fixed to the armature. This clutch is so arranged that the armature will not revolve with the magnet unless it (the magnet) is energized.

Rotatably mounted on the shaft 5 and above the electro-magnetic clutch is a drum 12 on which are fixed a plurality of spaced circular contacts or conducting cams 13 which have a common cross bar 14 connecting them together. On the lowest portion of the drum 12 is a bushing 15 with an extending portion or arm 16, with which the pin 9 contacts to drive the drum 12 carrying the cams 13. Concentric with the cams or contacts 13 is a frame member 17 upon which are subscribed vertical ordinates 18 for positioning wiping switches 19. These switches are adjustable with relation to each other, and in this particular case the ordinates are spaced an even inch apart, but this is merely discretionary and they may be spaced in fractions of inches, etc., if desired. These ordinates are for guiding purposes only, and may be dispensed with if desired, or other guiding means provided, as will hereinafter be described.

So that the general organization may be clear, it should be explained that the shaft 5 turns with the rolls 1 and 2. The shaft 5 bears the magnetic clutch member 6. An armature 7 is also mounted on the shaft, and means are provided whereby this armature may drive the drum 12 bearing a series of contact making elements, if it be desired to sort sheets between two predetermined lengths. The object of the mechanism is to cause the contact making devices associated with the drum 12 to come into action as soon as the minimum sheet length is reached, and continue in action so as (indirectly) to actuate the distributing mechanism throughout the several sheet lengths that lie between maximum and minimum for sorting purposes. Consequently, the drum should start to rotate as soon as the minimum sheet length is reached, and should continue its rotation with any particular sheet thereafter. A series of switches are provided so that when a sheet enters the rolls 1 and 1a the magnetic clutch 6 will be energized and the armature 7 therefore caused to rotate with the clutch. But since it is desired to move the drum 12 only with that portion of the sheet which lies between minimum and maximum length, it will be clear that the armature 7 should move through a predetermined distance before it begins to drive the drum 12. The armature 7 drives the drum 12 by means of the pin 9 which contacts the member 16. If the pin 9 is fixed upon the armature 7, then the distance which the armature 7 may move before it becomes effective in moving the drum 12, may be determined by the initial starting position of the armature.

To this end a lever 80 is provided rotatably mounted upon the shaft 5 and extending out to a circular bar 81, as shown in Figure 7, which may bear a scale 82. The lever may thus be adjusted along the scale to various positions representative of the minimum length of sheet, and when so adjusted, will serve as a stop for the pin 9, whereby the return position of the armature 7 may be gauged. The position of rest of the drum 12 is that shown in Figure 1, and is determined by a fixed pin on the frame of the device (not shown) against which a spring causes the drum to return to a period of rest after it is released from contact with the pin 9. The armature 7 flies back under the influence of its spring 11 for a greater distance, namely, until the pin 9 strikes the lever 80 in its adjusted position. Consequently, the lever 80 determines the distance through which the armature 7 shall rotate before it is effectively connected with the drum 12 so as to cause the rotation thereof. This distance is representative of the minimum length of the sheets in any unit of length desired. In the operation of my device the lever 80 is set along the scaled bar 81 for the minimum length of the sheets to be measured in any units desired, and the wiping switches 19 are set with reference to each other for the various desired sorting lengths into which the sheets are to be classified between minimum and maximum lengths.

The wiping switches 19, shown diagrammatically in Figure 1, are more particularly illustrated in Figure 8 where 19a represents the actual contact, and 19b a member slidably mounted upon an arcuate member 83 and provided with adjusting means 19c. The arcuate member 83 may be scaled as at 84 which scaling may serve as an adjunct to or in place of the ordinates 18 upon the frame 17.

Operatively mounted adjacent the pinch rolls are normally open, sheet-actuated switches 20, Figure 1, which are connected in series with each other. One side of these switches is connected to a lead line 21 from one side of the main power line 22. There is another bank of switches 24 connected to each other in parallel, which are normally closed. A connection 23 connects one side of bank 24 with lead lines 21 and 22. When a sheet passes through the pinch rolls, it closes switches 20 and at the same time opens switches 24. A line 25 from the other side of switches 24 extends to and is connected to a series of ball releasing magnets 26 (see Figs. 2 and 3). The number of ball releasing magnets will correspond to the number of wiping switches 19 on the frame 17. A line 27 from the other side of the bank of switches 20 connects to one side of the solenoid of a contactor switch 28. The other side of the solenoid of the contactor switch is connected to the other side of the power line 29. There are leads 31 and 31a connecting the brushes of the magnet 6 of the electro-magnetic clutch through the contactor switch 28, and hence to the power lines by leads 30 and 30a. Thus, it can be seen that when the switches in the bank 20 are closed by the passing of the sheet through the rolls, the solenoid of the contactor switch is energized and the magnet 6 is energized.

My machine is able to sort according to the longest length which it is possible to shear out of a sheet which has a "fish tail", or other uneven ends. In other words, the machine will distribute, so that regardless of the shape of the ends of the sheets, each sheet in any particular pile will shear out to the length designated for that particular pile, with a minimum of scrap loss.

To this end I have shown 6 double switches, 20 and 24, Figure 1, instead of only one. The levers of these six switches, or any desirable or practical number, are mounted in a straight line transverse to the table, and parallel to the pinch rolls. When the sheet moving along the conveyor depresses the switch levers, all the levers must be down before the actual measurement commences. For example, a sheet with a round end would depress one or two levers in the center of the table and then one by one or two by two the levers toward the edge of the sheet. All the levers must be depressed before measurement starts; therefore, the last lever depressed determines the line on which the shear cut is made in order to cut off the minimum amount of scrap.

The location of cut on the tail end of the sheet is determined by the position at which the first lever flies up, whether it be at the center or near the edge of the sheet. In the case of a real "fish tail" one or two levers at the center usually come up first and although the remaining switch levers are kept down by the tails of the sheet, hence the last lever down and the first lever up determine the real or effective length of the sheet and hence the pile to which the sheet will be sorted.

It should be understood that when sorting articles in accordance with other qualities than length, the drum 12 may be caused to revolve more or less in accordance with the magnitude of said other quality.

By selective sheet piling mechanism, I refer to mechanism for removing the sheet from the conveyor at a predetermined stage. Such mechanism does not form part of my present invention, and is not shown. It may be of any suitable form. Satisfactory sheet piling mechanism is shown in the copending application of George A. Reeve filed Feb. 25, 1932, Ser. No. 595,033.

Figure 2:
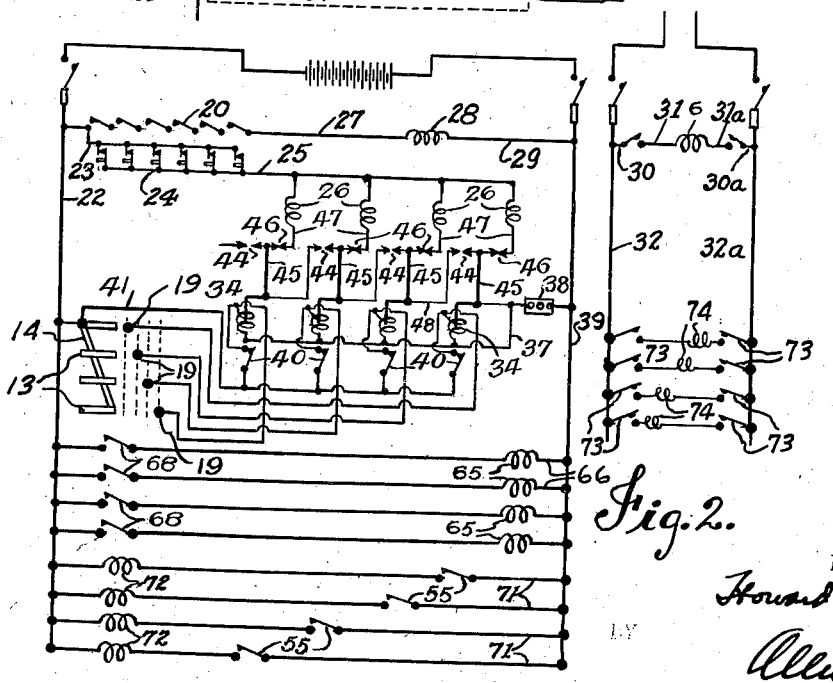
Fig. 2 is a wiring diagram for four wiping switches, relays, ball releasing magnets and clutch controlling circuit.
Figures 3, 6:
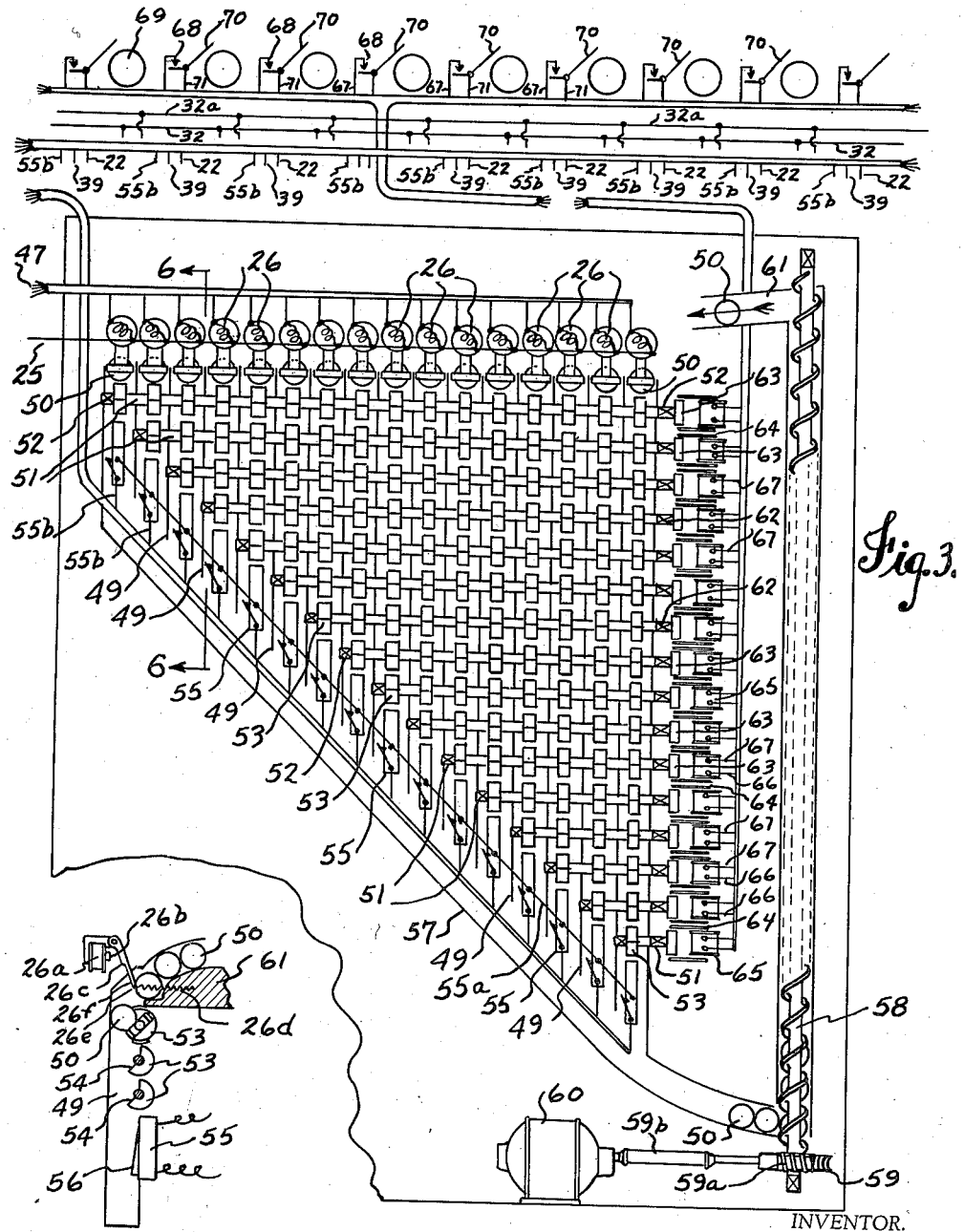
Fig. 3 is a diagrammatic representation of the distributing panel and the continuation of the conveyor from Fig. 1.
Fig. 6 is a diagrammatic representation of the ball releasing magnet and hopper for the balls.

Each of the wiping switches 19 has a lead running from it to the coil 34 of a solenoid relay switch 35 (Fig. 2 shows the wiring diagram, while Fig. 5 shows the general set up). The other end of these coils is connected by a line 36 into a line 37 which is controlled by a clearing switch 38 connected into the other power line 39 of this circuit. There are a set of sealing switches 40, one side of which is connected by a branch line 41 to the power line 22, the other side of these switches being connected into the line 33 in such a way as to shunt across the wiping switch arrangement, and thus to keep the solenoid of the relay switches energized after the line through the wiping switches is broken. These switches 40 are thrown by the energization of coil 34 and keep this coil energized through the sheet measuring period. The first coil has a shunt connection 48 to complete the circuit from this coil to the next succeeding coil when a normally open switch 44 on a swinging arm 45 is closed. On the other side of the swinging arm 45 there is a normally closed switch 46, which is, of course, opened by the closing of switch 44, due to the swinging of the arm 45. Running from switch 46 is a lead 47 connecting one side of this switch to one side of the coils of the ball release magnet 26. The other side of this magnet 26 is connected by wire 25 through the switches 24 to the power line. These arms 45 are acted upon by the coils of the different relay switches; and there is a hook-up on each one of them to one of the ball releasing magnets, similar to that described above. In each case there is a line 48 connecting the switch 44 to the next succeeding swinging arm of the next relay switch in line.

The distributing panel (best shown in Fig. 3), is composed of a series of vertical channels 49, which are large enough to allow the free falling of the balls 50. Perpendicular to these channels and alongside of them are shafts 51 rotatably supported in bearings 52 on the outer sides of the rack supporting the channels. On these shafts are fixed discs 53, the peripheries of which enter into the channels. These discs have a concave cut-out portion 54 to retain the balls and to keep them from falling any further, unless released by the rotation of the disc and shaft. There are as many shafts as there are wiping switches, and as many channels as there are shafts. The top shaft will have as many discs as there are channels, that is, one disc will be placed partly in each channel. Each succeeding shaft will have one disc less than the one before it, and the last shaft will have but one disc, and each shaft will have one more disc in it than the next preceding one. This arrangement will form a right angled triangle as in Fig. 3, with the channels getting longer from left to right and the shafts getting shorter from top to bottom.

At the bottom of each column of discs there are switches 55 with spring contacts 56 against which the ball strikes and closes the switch and hence the circuit. The balls are held at the top of each channel by their respective latches, and when they are released they fall down the channel in stages governed by the rocking shafts and discs; when they reach the bottom they throw the switches 55 and pass on to a sloping bottom channel 57 which rolls them to a vertical screw 58, which revolves and lifts them up to the feeding position 61. One side of the switches 55 have a common lead 55a which is connected to the power line 22; the other side of each switch is connected by lead 55b to the ball releasing magnet. The vertical screw 58 is driven through suitable worm gears by a motor 60.

The ball releasing magnet, in my preferred form (Fig. 6), consists of the usual coil 26a and core 26b positioned so as to attract a pivotally mounted latch 26c when the coil is energized. A spring 26d is attached to a pin 26e on the end 26f of the latch and pulls the latch back to the position shown so as to prevent the next ball in line from falling until the magnet is again energized.

Fixed on the end 62 of shaft 51, which rotates and holds the discs, there is an armature 63 disposed, somewhat out of alignment, between the poles 64 of the magnetic coil 65 (this is true of each of the shafts). These coils, when energized, rock the shaft 51 and allow the balls to drop down, whereupon the shaft returns to its previous position. The shafts are caused to rotate in sequence, starting from top to bottom, as the sheet moves past the various distributing stations. One side of the coils 65 is connected by lead 66 to the main power line 39, while the other side of the coils is connected by leads 67 to switches 68 to be explained later.

Extending from the exit end of the pinch rolls is the usual type of conveyor 69 over which the sheets to be measured and sorted pass (Fig. 1). At certain fixed intervals along this conveyor are positioned switches 68. As the sheets pass over each switch they throw a lever 70 which closes it. One side of these switches is connected to the power line 39 by lead 71, while the other side is connected to the coils for rocking the ball dropping disc shaft 51, and is a continuation of the lead 67.

Alongside of the conveyor and in line with the switches 68 are positioned sheet pilers (not shown). Each piler has an individual clutch controlled electrically. The leads 55b from the normally open switches 55, Fig. 3, will be connected to one side of a solenoid coil 72 (Fig. 4) and the other side of this coil will be connected to the power line 39. The other side of this power line 22 is connected to a limit switch 99, and from there is connected to a seal switch on solenoid coil 72 and from there is connected at the same point as the lead 55b. The switch 73 of the clutch controller energizes a solenoid 74 which in turn operates the clutch.

Operation

In order to operate this device, the lever 80, Fig. 7, which fixes the amount of turn of the armature and pin (8 and 9) before the pin 9 hits the extension 15 and thus turns the drum 12 that carries the contacts 13 (Fig. 1), is set for the minimum length of sheet to be measured; and the wiping switches 19 are set at equal fractional parts of the difference between the minimum and maximum lengths to be measured and sorted, by adjusting the wiping switches on their respective bars.

A sheet is passed between the rollers 1 and 1a, thereby closing the normally open switches 20 which completes the circuit to the magnet 6 and also places a live lead on the cams 13. The energized magnet 6 attracts the armature and rotates it through a distance equivalent to the predetermined adjusted minimum length of the sheet to be measured. When the armature has rotated this distance, the pin 9 engages the flange 16 of the bushing 15 on which the drum 12 carrying the cams 13 is mounted, and rotates it together with the cams. As the drum rotates, the cams engage the wiping switches in succession and complete the circuits to the coils of the relay switches 34. As each coil is energized the normally closed switch 46 of that particular relay will be opened. This prevents the particular ball releasing magnet from becoming energized and releasing the ball. The normally open switch 44 will be closed and thereby provide a live line to the next coil on the next relay switch; and when its wiping switch comes in contact with its cam, the circuit through that coil will be completed and its normally closed switch will be opened and cut out the next ball releasing magnet. The above operation of energizing the relays in succession continues until the sheet passes from between the rolls.

When the sheet passes from the rolls the normally open switches will re-open and de-energize the magnet 6 that is rotating the cams 13. Simultaneously the normally closed switches 24 which were open while the sheet was passing through the rolls, will close and complete a circuit to a particular ball releasing magnet which was left with a live side because the normally closed switch 46 of its particular relay switch had not been opened. The instant the normally closed switches reclose, the ball will fall to the row of discs and be held there. As the sheet passes over the conveyor, it engages the levers on the switches 68 and closes them. As each switch closes, the magnet connected to the switch will rotate that shaft with the discs upon it, which is hooked up to that particular switch, so that the ball can fall onto the next disc below it and so on until it strikes the lever on the clutch controller switches 55. When the clutch controller switches close, a circuit to the clutch controller will be completed; and the solenoid operating the clutch will be energized. The clutch will, of course, engage and drive the piling mechanism to remove that particular sheet to a selected pile located alongside the conveyor. As soon as these operations are completed, the entire circuit will be de-energized and the parts will return to the position of the start.

If the sheet is shorter than the minimum length, the armature will not rotate, for the pin 9 will not have turned far enough to move the cam carrying sleeve. Thus, no part of the circuit will be energized; the pilers will not come into operation; and the sheet will pass to the end of the conveyor and be deposited there.

If the sheet is longer than the maximum length of sheets to be measured, all the wiping switches will come into contact with all of their respective cams, and will energize all of the relays. This in turn will cut out all of the ball releasing magnets. Since the ball relasing magnets are cut out, the switch operating the clutch controller will not be operated, and the clutch will not operate the piling mechanism. The sheet will run the full length of the conveyor and be deposited at the end thereof.

It can be seen from the above explanation that there can be as many different piling mechanisms at as many different points for stacking and sorting as many different lengths of sheet as may be desired. All that is necessary is to increase or decrease the number of separate parts of the total mechanism.

Having thus described my invention, what I claim as new and desire to secure by Letters Patent, is:—

1. In a sheet sorting and measuring device having a plurality of selective delivery mechanisms associated with a conveyor, measuring means, selective mechanism associated with said measuring means, controlling means comprising a plurality of ball race-ways, means for causing balls to pass intermittently through said raceways in a series of stages, means actuated by the sheet as it passes certain predetermined stations along the conveyor, for controlling said last mentioned means, an operative connection between said selective means and said controlling means to release a selected ball, and means for causing said ball to actuate a selective delivery mechanism after having passed to the final stage of its particular race-way.

2. In an electrical apparatus for measuring and sorting sheets, a conveyor mechanism, pinch rolls for feeding said sheets, normally open switches closed by the passage of said sheets between said pitch rolls to determine the initial point of the dimension being measured, normally closed switches arranged to be opened simultaneously with the operation of said normally opened switches and whose re-closing determines the terminal point of the dimension being measured, rotating contact members actuated by said pinch rolls, and an operative connection between said switches and said rotating contact means for operating the latter only when a sheet is passing through said pinch rolls.

3. In a sheet measuring and sorting device measuring and selecting means comprising a roll turning with the sheet, a shaft driven by said roll, a magnetic clutch on said shaft, an armature on said shaft, a selective means adapted to be driven by said armature, sheet actuated means for energizing said clutch, and means for permitting a predetermined arc of rotation of said armature prior to the effective coupling thereof with said selective means, said means being adjustable and comprising a pin on said armature, a striking bar on said selective means, adjustable stop mechanism for said pin to determine the point of rest of said armature, and fixed stop mechanism for said selective means for predetermining its point of rest.

4. In a sheet measuring and sorting device, measuring and selecting means comprising a roll turning with the sheet, a shaft driven by said roll, a magnetic clutch on said shaft, an armature on said shaft, a selective means adapted to be driven by said armature, sheet actuated means for energizing said clutch, and means for permitting a predetermined arc of rotation of said armature prior to the effective coupling thereof with said selective means, said means being adjustable and comprising a pin on said armature, a striking bar on said selective means, adjustable stop mechanism for said pin to determine the point of rest of said armature, and fixed stop mechanism for said selective means for predetermining its point of rest, said movable stop mechanism comprising a pivoted lever and a scale to which said lever may be adjusted.

5. In a sheet measuring and sorting device, measuring and selecting means comprising a roll turning with the sheet, a shaft driven by said roll, a magnetic clutch on said shaft, an armature on said shaft, a selective means adapted to be driven by said armature, sheet actuated means for energizing said clutch, and means for permitting a predetermined arc of rotation of said armature prior to the effective coupling thereof with said selective means, said means being adjustable and comprising a pin on said armature, a striking bar on said selective means, adjustable stop mechanism for said pin to determine the point of rest of said armature, and fixed stop mechanism for said selective means for predetermining its point of rest, said selective mechanism comprising a drum, fixed contacts on said drum and movable wiping contact members associated therewith, said contact members being adjustable for different lengths of sheets.

6. In a sheet measuring and sorting device, measuring and selecting means comprising a roll turning with the sheet, a shaft driven by said roll, a magnetic clutch on said shaft, an armature on said shaft, a selective means adapted to be driven by said armature, sheet actuated means for energizing said clutch, and means for permitting a predetermined arc of rotation of said armature prior to the effective coupling thereof with said selective means, said means being adjustable and comprising a pin on said armature, a striking bar on said selective means, adjustable stop mechanism for said pin to determine the point of rest of said armature, and fixed stop mechanism for said selective means for predetermining its point of rest, said selective mechanism comprising a drum, fixed contacts on said drum and movable wiping contact members associated therewith, said contact members being adjustable for different lengths of sheets, and comprising curved bars concentric with said drum, and means for moving said contact members mounted on said rods.

7. In a measuring and sorting device, controlling means comprising a plurality of ball raceways of different effective lengths, a return path for said balls, feeding mechanism and means for holding balls in position above said race-ways, selective ball releasing mechanisms for said race-ways, a plurality of ball hold up controllers in said race-ways, a plurality of cam shafts, and ball actuated switching means at the ends of said race-ways, some of said ball hold up controllers at least being common to said several race-ways, and comprising stops associated on said cam shafts, and means for moving said shafts.

8. In a measuring and sorting device, controlling means comprising a plurality of ball race-ways of different effective lengths, a return path for said balls, feeding mechanism and means for holding balls in position above said race-ways, selective ball releasing mechanisms for said race-ways, a plurality of ball hold up controllers in said race-ways, a plurality of cam shafts, and ball actuated switching means at the ends of said race-ways, some of said ball hold up controllers at least being common to said several race-ways, and comprising stops associated on said cam shafts, means for moving said shafts, a conveyor, switches associated with said conveyor, and means controlled by said switches for selectively rocking said shafts.

9. In a sorting and measuring device, a conveyor having a plurality of selective delivery mechanisms, a pair of pinch rolls, driven means associated with said pinch rolls, selective means adapted to be driven by said driven means, switches associated with said pinch rolls for effectively connecting said selective means therewith when a sheet is passing therethrough, controlling means comprising a plurality of ball race-ways having return paths, ball hold up actuators associated with said race-ways, ball releasing mechanisms associated with said race-ways, an operative connection between said selective mechanism and said ball releasing devices, ball hold up actuator switches on said conveyor, operative connections between said switches and said ball hold up actuating mechanisms, and means whereby a selected ball, having passed through a plurality of stages, may actuate a selective delivery mechanism.

10. An electrical apparatus for measuring and sorting sheets of metal in combination with a conveyor system, comprising pinch rolls for feeding said sheets of metal, normally open switches closed by the passage of said sheets of metal between said pinch rolls, normally closed switches opened simultaneously with the closing of said normally open switches, rotating contacts actuated by said pinch rolls connected with said normally open switches, wiping switches for engagement with said contacts, relay switches connected in series with said wiping switches, normally closed switches opened by said relay switches in sequence with the engagement of said wiping switches with said contacts, ball releasing magnets in series with said relay switches, normally open switches actuated and closed simultaneously with the opening of said normally closed switches by said relays, another relay switch energized by the closing of another wiping switch, another ball releasing magnet succeeding said previously cut out ball releasing magnet in condition to be completely energized, when a sheet of metal passes from between said pinch rolls, by the closing of the normally closed switches, gravitationally actuated balls released by the energization of said releasing magnets, rotative elements inhibiting the continued fall of said balls, together with means for actuating said rotative elements to deliver said balls by intermittent falls to a switch for actuating a removal device to deliver said sheets of metal at a proper station along said conveyor.

11. Electrical apparatus for measuring and sorting sheets of metal in combination with a conveyor and sheet removal device, comprising pinch rolls, normally open switches and normally closed switches actuated by the passage of said sheets between said pinch rolls, a magnet rotated by said pinch rolls energized upon closing of said normally open switches, spaced wiping switches with rotatable contacts actuated by the energization of said magnet adapted to rotate through a distance equivalent to the minimum length of sheet before contacting the said spaced wiping switches, said wiping switches adapted to be energized in sequence and spaced corresponding to a fractional distance between the minimum and maximum length of said sheets, relay switches in series with said wiping switches energized upon contact of said wiping switches with said rotating contacts, sealing switches closing in sequence and retaining said relay switches, energized normally closed switches opened by said relays, corresponding ball releasing magnets de-energized by the opening of said normally closed switches, normally open switches closed by the energization of said relay switches to condition a next succeeding relay switch for energization upon closing of a next succeeding wiping switch, said ball releasing magnets connected to said normally closed switches on said relays adapted to release a ball upon the reclosing of said normally closed switches opened by the passage of said sheets between said pinch rolls.

12. Electrical apparatus for measuring and sorting sheets of metal in combination with a conveyor and sheet removal device, comprising pinch rolls, normally open switches and normally closed switches actuated by the passage of said sheets between said pinch rolls, a magnet rotated by said pinch rolls energized upon closing of said normally open switches, spaced wiping switches with rotatable contacts actuated by the energization of said magnet adapted to rotate through a distance equivalent to the minimum lengh of sheet before contacting the said spaced wiping switches, said wiping switches adapted to be energized in sequence and spaced corresponding to a fractional distance between the minimum and maximum length of said sheets, relay switches in series with said wiping switches energized upon contact of said wiping switches with said rotating contacts, sealing switches closing in sequence and retaining said relay switches, energized normally closed switches opened by said relays, corresponding ball releasing magnets de-energized by the opening of said normally closed switches, normally open switches closed by the energization of said relay switches to condition a next succeeding relay switch for energization upon closing of a next succeeding wiping switch, said ball releasing magnets connected to said normally closed switches on said relays adapted to release a ball upon the reclosing of said normally closed switches opened by the passage of said sheets between said pinch rolls, said balls adapted to drop intermittently to compensate for the time of travel of said sheet to a particular point on said conveyor for removal.

13. Electrical apparatus for measuring and sorting sheets of metal in combination with a conveyor and sheet removal device, comprising pinch rolls, normally open switches and normally closed switches actuated by the passage of said sheets between said pinch rolls, a magnet rotated by said pinch rolls energized upon closing of said normally open switches, spaced wiping switches with rotatable contacts actuated by the energization of said magnet adapted to rotate through a distance equivalent to the minimum length of sheet before contacting the said spaced wiping switches, said wiping switches adapted to be energized in sequence and spaced corresponding to a fractional distance between the minimum and maximum length of said sheets, relay switches in series with said wiping switches energized upon contact of said wiping switches with said rotating contacts, sealing switches closing in sequence and retaining said relay switches, energized normally closed switches opened by said relays, corresponding ball releasing magnets de-energized by the opening of said normally closed switches, normally open switches closed by the energization of said relay switches to condition a next succeeding relay switch for energization upon closing of a next succeeding wiping switch, said ball releasing magnets connected to said normally closed switches on said relays adapted to release a ball upon the reclosing of said normally closed switches opened by the passage of said sheets between said pinch rolls, said balls adapted to drop intermittently to compensate for the time of travel of said sheet to a particular point on said conveyor for removal, said intermittent dropping controlled by switches actuated by said sheets.

14. In a sheet measuring and sorting device, a conveyor having selective delivery mechanisms, measuring means comprising sheet actuated switches, selective means controlled thereby, said selective means comprising means adjustable to the minimum length of sheet, and means adjustable to various lengths between minimum and maximum, controlling means actuated by said selective means, said controlling means comprising a body adapted to pass through several stages, means for controlling the passage of said body through said stages, sheet-actuated switches on said conveyor, connections between said switches and said passage controlling mechanisms, a switch positioned to be actuated by said body, and a connection between said switch and a selective delivery mechanism.

HOWARD C. SNYDER.